Feb. 25, 1964   W. E. DION ETAL   3,122,690
CONTROL CIRCUIT FOR VIBRATORY DEVICES
Filed Oct. 9, 1961

INVENTORS
WARREN E. DION
GRANT N. WILLIS

BY *Lindsey, Prutzman and Hayes*

ATTORNEYS

United States Patent Office 3,122,690
Patented Feb. 25, 1964

3,122,690
CONTROL CIRCUIT FOR VIBRATORY DEVICES
Warren E. Dion and Grant N. Willis, Bristol, Conn., assignors to The Arthur G. Russell Company, Incorporated, Bristol, Conn., a corporation of Connecticut
Filed Oct. 9, 1961, Ser. No. 143,777
5 Claims. (Cl. 318—128)

This invention relates to control circuits for vibratory devices and more particularly to circuits for controlling vibratory feeding equipment such as vibratory bins, hoppers or transport rails.

The principal object of this invention is to provide an improved circuit for supplying fluctuating current to solenoids which are mechanically coupled to drive the vibratory system.

It is a further object of this invention to provide an improved hopper control circuit which will maintain a constant rate of feed of parts from the hopper over a wide range of ambient conditions, hopper parameters, and parts load.

It is a still further object of the present invention to provide an improved control circuit for gating control current to an actuating device in accordance with the vibratory amplitude of the device being controlled.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
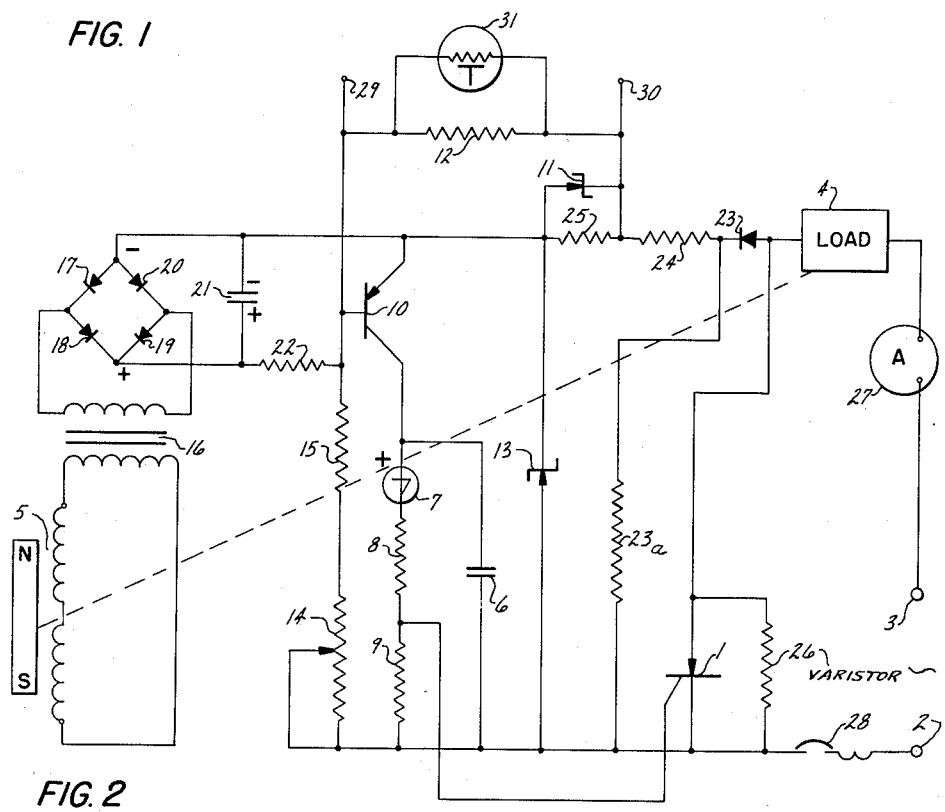
FIG. 1 is a schematic diagram of an automatic hopper control circuit.

In FIG. 1 there is shown a silicon controlled rectifier 1 which rectifies the A.C. line voltage applied to terminals 2 and 3 and controls the amount of current supplied to load 4, which load will normally be the winding of the solenoid which drives the vibratory device. The vibratory amplitude of the device is sensed by transducer generally designated 5 which provides an output signal proportional to vibratory amplitude to control the firing phase of controlled rectifier 1 and, hence controls the amount of current delivered to load 4.

The controlled silicon rectifier 1 has the capability of holding off the full line voltage until a gating pulse is applied to the gate terminal, after which the controlled rectifier breaks down and passes current without substantial attenuation as long as a sufficient forward current supply is maintained. The controlled rectifier will not conduct reverse current. After being gated "on" during a positive half cycle of supply current, the controlled rectifier will conduct for the remainder of the positive portion of the cycle and will cut off for the negative portion. The average current supplied by the controlled rectifier to the load may be varied by changing the timing of the gating signal.

A positive gating pulse for the controlled rectifier 1 is generated by discharging capacitor 6 through an "avalanche" diode 7 and current limiting resistors 8 and 9. The "avalanche" diode has the property of acting as a substantially open circuit until the voltage across the diode reaches a critical point. At the critical voltage, the diode breaks down and acts as a good current conductor as long as forward current is maintained. Of course, any nonlinear, voltage responsive element or negative resistance voltage responsive element possessing similar operating characteristics may be used, such devices including unijunction transistors, some silicon controlled rectifiers, etc. The capacitor 6 is charged toward the critical voltage and when this critical voltage is reached, the diode 7 breaks down thus rapidly discharging capacitor 6 and generating a sharp voltage pulse across resistors 8 and 9, which pulse is transferred to the gating terminal of the controlled rectifier. The charging cycle of capacitor 6 is initiated when the line voltage begins a positive half cycle and the critical voltage for diode 7 is reached sometime during this positive half cycle. By controlling the charging current to capacitor 6, the gating pulse may be produced any time during the positive half cycle of the line voltage, thereby controlling the firing angle of the controlled rectifier 1 and the amount of current delivered to load.

The time required to charge capacitor 6 to the critical voltage is dependent upon the charging current supplied by transistor 10. Transistor 10 is connected as a constant current source in which the collector current is proportional to the base-emitter current over a wide range of collector voltages. By controlling the base current of transistor 10, the firing time of controlled rectifier 1 can be controlled.

The base current for transistor 10 is supplied from three current sources. The first current source includes Zener diode 11 and current controlling resistor 12. The current supplied by this source is constant and is determined by the constant breakdown voltage of Zener diode 11. The polarity of the current established by the indicated connection of Zener diode, 11, is such that it would tend to prevent conduction of transistor 10.

The second source supplying base current to transistor 10 includes Zener diode 13, variable resistor 14 and resistor 15. The current supplied by this source is controlled by the value of resistor 15 and the setting of variable resistor 14. Since Zener diode 13 is connected in the opposite polarity from Zener diode 11 (each with reference to the emitter of the transistor) the current resulting from the voltage developed across Zener diode 13 would tend to cause conduction of transistor 10.

The third source of base current for transistor 10 includes the vibration transducer 5, matching transformer 16, bridge rectifiers 17–20, filter capacitor 21 and current controlling resistor 22. This network delivers current which is a direct function of vibratory amplitude to the base of transistor 10, this current being poled to prevent conduction in transistor 10. Summarizing, transistor 10 is a current adder which causes the charging time of capacitor 6 to be a function of the algebraic sum of a fixed reverse current source, an adjustable forward current source, and an amplitude dependent reverse current source.

Other components in the circuit of FIG. 1 perform the following functions. A diode 23 is provided to shut off the power to the control circuitry during the negative half cycle of the line voltage, thereby reducing dissipation in the control elements. Resistor 23a provides a reverse bias leak for diode 23. Resistor 24 limits the current in diode 23. Resistor 25 limits the maximum voltage impressed across diode 11.

A varistor 26 is provided to preevnt the generation of inductive spike voltages which could damage controlled rectifier 1 when the load current is shut off. A load current meter 27 is provided for the convenience of the user and a thermal-type circuit breaker 28 limits damage caused by a circuit fault.

In order to start and stop the vibratory feeder in accordance with the demands of the machine it feeds, provision is made to interrupt the power to the control elements only rather than switching the entire load current. To this end, terminals 29 and 30 are provided so that a controlling switch or, broadly speaking, any variable impedance device may be connected into the circuit. When this switch is closed, effective circuit impedance is changed and increased reverse bias current is fed to the base of transistor 10 thus preventing charging of capacitor 6 and consequent firing of the controlled rectifier 1.

When the controller is first switched on, full load current will normally be supplied to the driving mechanism and often results in objectionable "hammering" of the mechanical portions of the vibratory system. In order to prevent this, the feeder may alternatively be shut off by shunting resistor 12 with one of a lower valve. This will result in the accumulation of a considerable charge on capacitor 21 during the shut-off period. When the shunting resistor is removed, dissipation of the charge results in the immediate application to the base-emitter circuit of transistor 10, of a reverse current which diminishes with time, thus permitting the feeder to resume full amplitude gradually and smoothly.

In order to compensate for ambient temperature changes in the circuit parameters, a thermistor 31 is provided. As the temperature increases, more current flows through thermistor 31 tending to cut off transistor 10. By combining a proper value of resistor 12 with the thermistor 31, nearly complete compensation is obtained over a reasonable temperature range.

Figure 2:
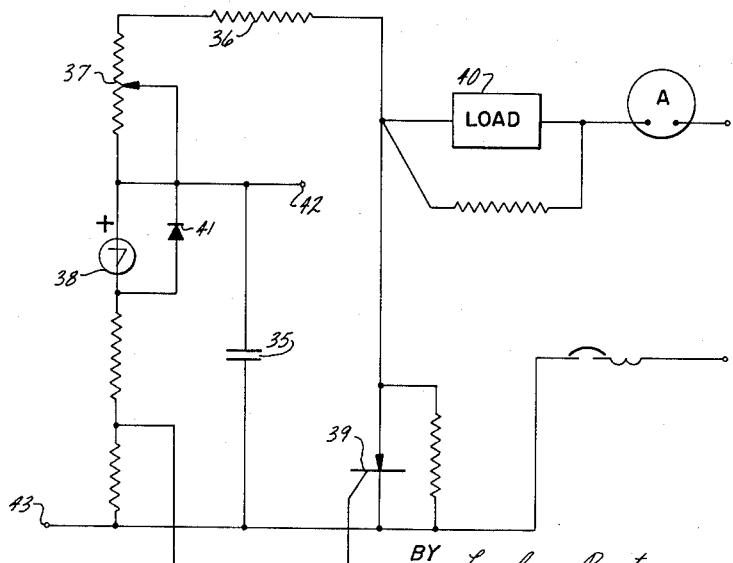
FIG. 2 is a schematic diagram of a manual hopper control circuit.

The operation of the controller of FIG. 1 is as follows. When the line voltage applied across terminals 2 and 3 goes positive, current flows through diode 23 to the control elements. When the line voltage reaches a sufficiently high value, the voltage across Zener diode 13 limits at, as an example, about 27 volts and the voltage across Zener diode 11 limits at about 6.8 volts. When the control is first switched on, the output of transducer 5 is zero, and the sum of the currents from the three sources applied to the base of transistor 10 is of a forward bias polarity. Saturation forward current is supplied to the base emitter circuit of transistor 10 through the resistors 14 and 15. This causes immediate charging of capacitor 6 and an early firing of the controlled rectifier 1 with consequent large load current being applied to the load 4. When the vibratory amplitude becomes larger, the output of transducer 5 increases. The current produced by the transducer network almost equals the forward current which is selected by setting variable resistor 14. The current supplied to the load 4 will then be reduced to a level which will just maintain the selected vibratory amplitude through well-known feedback control principles. A mechanical load applied to the vibratory system tends to reduce its vibratory amplitude, thus reducing the output of transducer 5. This in turn causes the controlled rectifier 1 to feed more current to the load 4, tending to maintain a constant vibratory amplitude.

Where automatic load compensation is not required, considerable economy may be obtained by utilizing some of the above principles in a manual controller circuit as shown in FIG. 2. In this controller, the charging rate of capacitor 35 is controlled by the value of resistor 36 and variable resistor 37. When the voltage across capacitor 35 reaches the critical point, diode 38 breaks down, thus producing a positive voltage spike which is applied to the gating terminal of the silicon-controlled rectifier 39. This voltage pulse fires the controlled rectifier 39, thus providing load current to the load 40. Diode 41 is provided to prevent build-up of reverse voltage across diode 38 during the negative half of the line voltage cycle. The charging rate of capacitor 35 is controlled by the setting of variable resistor 37 and the action of the circuit is similar to that of the feedback controller previously described. A controlling switch may be connected across terminals 42 and 43 for starting and stopping the controller. A switch, variable resistor, or control element such as a transistor may be used for this purpose.

From the foregoing description of the structure and operation of a preferred embodiment of this invention, it is apparent that an improved hopper control circuit has been provided to supply half-wave current from an A.C. power line to the drive mechanism of a vibratory device and to regulate the current to maintain a constant rate of feed of parts from the hopper.

As will be apparent to persons skilled in the art, various modifications and adaptations of the structure above described will become readily apparent without departure from the spirit and scope of the invention, the scope of which is defined in the appended claims.

We claim:

1. A vibratory device controller for supplying current from an A.C. source to a load which drives a controlled element in a vibration mode, said current being supplied in accordance with the magnitude of the vibration response of the driven element, said controller comprising a transducer producing an electrical output in accordance with the magnitude of the vibration response of said driven device, a controlled rectifier having two power terminals and a gating terminal, said two power terminals being connected in series with said A.C. source and said load, a timing capacitor, means to supply charging current to said timing capacitor from said A.C. source, means to vary said charging current in accordance with the magnitude of output of said transducer, an "avalanche" diode, said "avalanche" diode being connected across said timing capacitor, said "avalanche" diode being poled so as to break down when the voltage across said timing capacitor reaches a critical point, and means connecting said "avalanche' diode to said gating terminal whereby the breakdown of said "avalanche" diode produces a gating signal which fires said controlled rectifier and supplies current to said load.

2. The vibratory device controller recited in claim 1 wherein said means for supplying charging current to said timing capacitor includes a transistor, the emitter of said transistor being connected to said A.C. source, the collector of said transistor being connected to said timing capacitor, and the output of said transducer being connected to the base of said transistor.

3. The vibratory device controller recited in claim 2 and a diode connected between said A.C. source and the emitter of said transistor, said diode being poled so that charging current is supplied to said transistor only during the half cycle of said A.C. source which charges said capacitor toward said critical voltage.

4. The vibratory device controller recited in claim 3 and a first Zener diode, a variable resistor and a second resistor connected between the emitter and base of said transistor, said Zener diode being poled so as to provide forward bias current to the base of said transistor, a second Zener diode and a third resistor connected between the emitter and the base of said transistor, said Zener diode being poled so as to provide reverse bias current to said base, said variable resistance being adjusted so that the sum of the currents through said first and said second diodes is normally in the forward bias direction, means for rectifying the voltage output of said transducer and for producing a current in the reverse bias direction which increases in accordance with the output of said transducer, and means connecting said last-named current to the base of said transistor.

5. The vibratory device controller recited in claim 4 and fourth and fifth resistors connected between said "avalanche" diode and one of the power terminals of said controlled rectifier, the junction of said fourth and fifth resistors being directly connected to the gating terminal of said controlled rectifier whereby breakdown of the "avalanche" diode produces a voltage pulse at the junction of said fourth and fifth resistors which fires said controlled rectifier.

References Cited in the file of this patent

UNITED STATES PATENTS

| | | |
|---|---|---|
| 2,767,365 | Guggi | Oct. 16, 1956 |
| 2,909,705 | Husson | Oct. 10, 1959 |
| 2,928,007 | Prutt | Mar. 8, 1960 |
| 2,961,553 | Giger | Nov. 22, 1960 |
| 3,040,224 | Piltz et al. | June 29, 1962 |
| 3,050,611 | Kamide | Aug. 21, 1962 |

OTHER REFERENCES

Publications: "Solid State D.C. Switched Regulators," Electronics Magazine, Nov. 25, 1960, pp. 121–123; "General Electric Controlled Rectifier Manual," Published by G. E., Liverpool, N.Y., March 1960, pp. 95–97.